July 29, 1969  MASATOSHI MIGITAKA  3,458,703
REVERSE BIASED SEMICONDUCTOR LASER LIGHT MODULATOR FABRICATED
FROM SAME MATERIAL AS LASER LIGHT SOURCE
Filed July 26, 1965
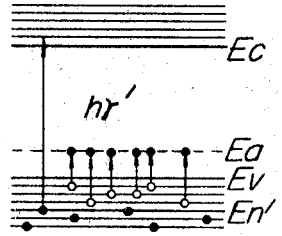
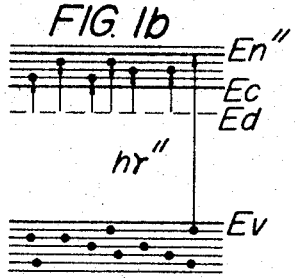
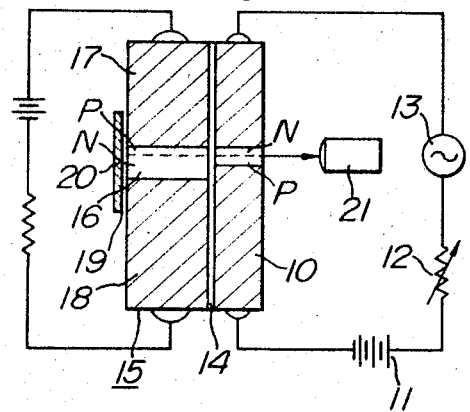
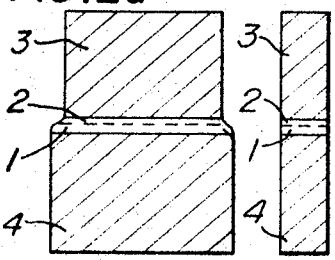
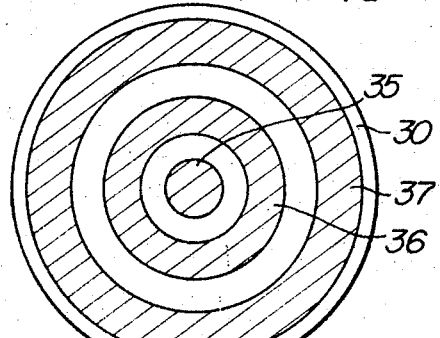
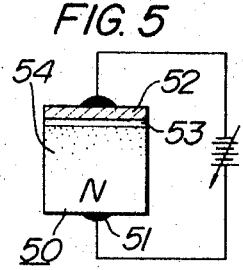
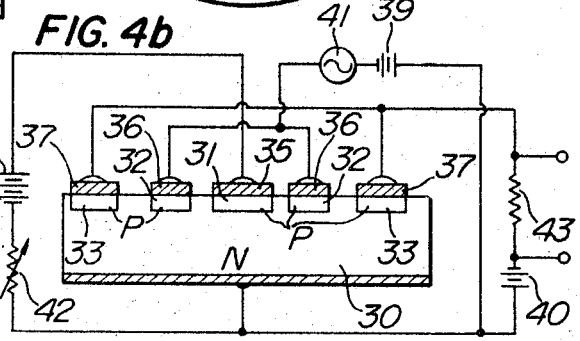
INVENTOR
Masatoshi Migitaka
BY Paul M. Craig, Jr.
ATTORNEY United States Patent Office 3,458,703
Patented July 29, 1969

3,458,703
REVERSE BIASED SEMICONDUCTOR LASER
LIGHT MODULATOR FABRICATED FROM
SAME MATERIAL AS LASER LIGHT SOURCE
Masatoshi Migitaka, Hachioji-shi, Japan, assignor to
Hitachi, Ltd., Chiyoda-ku, Tokyo, Japan
Filed July 26, 1965, Ser. No. 474,830
Claims priority, application Japan, July 29, 1964,
39/43,125
Int. Cl. H04b 9/00
U.S. Cl. 250—199                4 Claims

ABSTRACT OF THE DISCLOSURE

A light flux modulating device is described which includes a semiconductor modulating element comprised by a semiconductor of a first conductivity type having a semiconductor region of the opposite conductivity type formed thereon and defining a depletion layer therebetween. A reverse polarity bias signal is applied across the opposed different conductivity regions of the semiconductor modulating element for adjusting the thickness of the depletion layer to a desired value. A light beam (preferably monochromatic in nature) is projected through the depletion layer and an input signal is applied across the opposed, different conductivity regions of the semiconductor modulator element for controlling the effective thickness of the depletion layer in accordance with the input signal. A light sensitive detector is optically coupled to the output from the semiconductor modulator element for detecting the modulated light beam after having passed through the modulating element.

---

The present invention relates to semiconductor light flux modulating device which modulate a light flux by a voltage.

The present invention utilizes the phenomena that when light having specific wave length is transmitted through a semiconductor body, the absorption coefficient of each portion of the semiconductor body against said light varies in accordance with carrier distribution in the semiconductor body, and that the carrier distribution varies by the application of a bias voltage.

Heretofore, as for methods of light modulation, two methods, i.e. a mechanical method and a method utilizing a dielectric such as $NH_4H_2PO_4$ (ammonium dihydrogen phosphate, ADP), $KH_2PO_4$ (potassium dihydrogen phosphate, KDP) or the like, which is called Kerr effect, have been known.

The former has a disadvantage that a modulating frequency is limited to an audio frequency band or lower inasmuch as the intensity of light is modulated by varying an aperture disposed in the optical path by a signal to be modulated, whereas the latter, which utilizes polarized light, has the disadvantages that the light to be modulated should be polarized, a high voltage, e.g. 1000 to 2000 volts, is necessary to operate the dielectric element, a considerable power, for example 10 watts or higher, is necessary to actuate the modulation, and the loss of light in the dielectric is considerable (approximately 6 db).

Therefore, the object of the present invention is to provide a novel semiconductor device for light modulation free from the above disadvantages.

The description of the present invention will be made with reference to the accompanying drawings, in which:

FIGS. 1a and 1b are energy level diagrams of a p-type and an n-type semiconductor, respectively;
FIG. 2a is an elevation view of a device utilized in the present invention;
FIG. 2b is a side view of the device of FIG. 2a;
FIG. 3 is an embodiment of the present invention;
FIGS. 4a and 4b are another embodiment of the present invention; and
FIG. 5 is a diagram showing a method of forming a depletion layer in a semiconductor body.

A semiconductor doped with p-type or n-type impurity has a considerable number of holes or electrons in its valence band or conduction band at around room temperature. FIGS. 1a and 1b are energy level diagrams representing these states. FIG. 1a is the energy level diagram of a p-type semiconductor and FIG. 1b is that of an n-type semiconductor. In these figures, $E_c$ represents the energy level of the bottom of the conduction band, $E_v$ that of the top of the valence band, $E_a$ an acceptor level, $E_n'$ the energy level of the electron having the highest energy in the valence band, $Ed$ a donor level, and $En''$ the lowest vacant energy level capable of accepting a fresh electron in the conduction band. The difference of energies between the bottom of the conduction band and the top of the valence band $E_c-E_v$, which is called an energy gap, is usually denoted by $E_g$. The energy of light (electromagnetic wave) is represented by $h\nu$, where $h$ is Planck's constant and $\nu$ is the frequency of the light. The manner in which an electron in the valence band is excited to the conduction band by the light having the energy $h\nu'$ or $h\nu''$ are shown in FIGS. 1a and 1b. As is evident from the figures, the excitation of electron does not always occur by the light having a slightly higher energy than the energy gap $E_g$. That is, it is necessary for the electron to be excited to have an additional energy of at least the difference from the top of the valence band $E_v-E_n'$, since in the p-type semiconductor there are holes at the top end of the valence band and the electron to be excited is in a lower level. In the n-type semiconductor, since an electron should be excited from the top of the valence band to a vacant state (a state higher than the energy level $E_n''$ in FIG. 1b) because of the presence of electrons at the bottom of the conduction band, only the light having an energy greater than the energy gap by at least the energy levels occupied by electrons at the bottom of the conduction band ($E_n''-E_v$) can excite the electron. However, since in a depletion layer there is no electron for the n-type semi-conductor or no hole for the p-type semiconductor, the excitation is satisfactorily actuated by the light having an energy greater than the energy gap $E_g$ in the depletion layer. Thus, the absorption coefficient for the light having the energy approximately equal to the energy gap is large in the depletion layer and small in other regions of the semiconductor. This invention utilizes the above principle.

The thickness of the depletion layer of a p-n junction can be varied easily by the voltage applied to the p-n junction. In particular, when a reverse bias is applied to the depletion layer, the impedance of the junction becomes very high, and therefore, the power necessary to actuate the modulation will be very weak. Moreover, in this case, since the junction capacity of the p-n junction can be made small, even high frequency modulation is possible, and a voltage less than several volts is sufficient. Further, while in the method using ADP or KDP polarized light is utilized, the polarized light is unnecessary for the present invention.

Although it is desirable for an impurity concentration in a semiconductor body to be low, since the variation of depletion layer by voltage is larger when the impurity concentration is lower, in order to make the difference between the absorption coefficient of the depletion layer and that of other portions for a specific light, it is desirable to fill as far as possible from the bottom of the conduction band or from the top of the valence band with carriers, and for this situation to take place with low impurity concentration a semiconductor having electrons or holes of small effective mass is desirable. The ratio of the effective mass of an electron ($n$) or a hole ($p$) of a semiconductor material to that of a free electron is 0.02 (n) and 0.5 (p) for InSb, 0.07 (n) 0.5 (p) for GaAs, 0.55 (n) and 0.35 (p) for Ge, and 1.08 (p) and 0.58 (p) for Si. Therefore, a group III–V intermetallic compound semiconductor such as InSb, GaAs or the like is comparatively suitable for the present purpose.

FIGS. 2a and 2b are respectively an elevation and a side view of a GaAs diode according to the invention. The diode is fabricated by diffusing Zn into one surface of a wafer 1 of n-type GaAs having the thickness of 100$\mu$ to the depth of approximately 50$\mu$ to form p-type layer 2. The diode is mesa-etched to form a mesa diode. Molybdenum electrodes 3 and 4 are then soldered to the diode. The resulting element is subsequently polished on surfaces perpendicular to the junction thereof in parallel to the thickness of 300$\mu$, after which a known GaAs laser diode is disposed on one of the surfaces so that the junctions of the two diodes may be aligned. In FIG. 3 illustrating one such arrangement, a reverse bias is applied to the GaAs diode 10 by a voltage source 11 through a variable resistor 12 and a signal source 13. A depletion layer is formed in the neighborhood of the p-n junction by the voltage of the voltage source 11, and the thickness of the depletion layer is varied by the signal from the signal source 13. On one side of the diode 10 is arranged the GaAs laser diode 15 holding a transparent insulating layer 14, e.g., a mica layer, between them. The laser diode is composed of a light emitting diode itself 16 and electrodes 17 and 18 attached thereto. On the opposite side of the p-n junction of the laser diode to the diode 10 is equipped a metal reflector 20 which may be formed by the evaporation of aluminum, holding a transparent layer 19 between them. If a forward current of the order of 500 A./cm.$^2$ is allowed to flow through the laser diode, light is emitted along the p-n junction. Due to the disposition of the reflector 20, the light emitted by the laser diode is directed to the diode 10. This light passes through the diode 10 to a suitable photo-detector, i.e., a photocell 21 disposed in this direction. The transmittivity of the diode 10 against this light is varied by the signal 12.

In one embodiment of the present invention, by superposing an A.C. voltage of several volts on a reverse bias of 5 volts applied to the modulating diode, the light emitted by the laser diode could have been modulated more than 10%. The modulation could have been actuated even over 10 mc.

Another embodiment of the present invention is shown in FIGS. 4a and 4b wherein the device of FIG. 3 is formed on a base wafer. An n-type GaAs base wafer 30 has on one surface thereof p-type diffusion layers 31, 32 and 33 formed by the selective diffusion of Zn. Metal electrodes 35, 36 and 37 are attached to the layers by evaporation. A semiconductor device of such construction can be easily fabricated by present-day manufacturing techniques known in the art.

Of the three diodes formed on the n-type GaAs base wafer, 31 is served as a light emitting diode, 32 as a modulating diode and 33 as a photo-detector diode. Bias voltage sources 38, 39 and 40, a signal source 41, a variable resistor 42 and an output resistor 43 are connected thereto as shown. The light emitted by the light emitting diode 31 is transmitted through the transparent GaAs base wafer 30, is modulated by the modulating diode 32, the modulated light signal is transmitted through base wafer 30 and then detected by the photo-detector diode 33 as an output.

In one embodiment such as shown in FIG. 3, the depth of the p-type diffusion layer is 30$\mu$, and the width and length thereof is 0.5 mm. x 10 mm. By the application of a modulating voltage of 2 volts, approximately 5% of light modulation has been detected. The modulation frequency could have been made 20 mc. or higher.

As is evident from the above description of the preferred embodiments of the present invention, the device according to the invention has such practical advantages that the improvement of frequency characteristics is possible, use is possible up to high frequency, the power necessary for modulation is very weak, and the like. In particular, as shown in one embodiment of the invention, it is possible to form the device in a single semiconductor body as a part of a solid state circuit.

In the above embodiments the laser diode is utilized as a light source because of its capability of obtaining a fine light beam and monochromatic light ready to be modulated. However, an equivalent light source to the laser diode can of course be substituted therefor. Further, it is also possible to use a depletion layer 54 formed in a semiconductor body 50 of some conductivity type by attaching an electrode 51 thereto and also attaching thereto another electrode 52 via a thin insulating layer 53, and by applying a bias voltage between these two electrodes as shown in FIG. 5 as a substitute of the depletion layer formed by applying a reverse bias as described above. It has already been found that of the light emitted by a light source, the light having the energy ranging from 0.8 to 1.2 times the energy gap of a semiconductor in which a depletion layer exists can sufficiently be modulated.

What I claim is:

1. A light signal modulating device including in combination a semiconductor laser device comprising a semiconductor laser element having a p-n junction therein, means for applying an operative voltage across said p-n junction to generate a laser light beam of specific energy and wavelength, a semiconductor diode element having a p-n junction fabricated from the same material as said semi-conductor laser element and having an energy gap corresponding to the specific energy of the laser light beam produced by the semiconductor laser element, said semiconductor laser element being disposed adjacent said semiconductor diode element so that substantially all of the light generated by said laser element is projected to pass through a depletion layer region in said diode element, means for applying a reverse bias voltage across the p-n junction of said semiconductor diode element to form a depletion layer therein, and means for varying said reverse bias voltage in accordance with an input modulation signal whereby said depletion layer selectively absorbs the light from said semiconductor laser element to produce an output modulated light beam representing the input modulation signal.

2. A light signal modulating device according to claim 1, wherein the energy level of the light beam produced by said laser element ranges approximately from 0.8 to 1.2 times as large as the energy gap of said diode element.

3. A light signal modulating device according to claim 2 wherein said laser element and said diode element are disposed in close relation to each other so that the p-n junctions formed in said laser element and said diode element are extended substantially coplanar to each other.

4. A light signal modulating device according to claim 1, wherein the device is fabricated from a single planar semiconductor substrate of a first conductivity type provided with a centrally disposed semiconductor surface region of a second conductivity type opposite to said first conductivity type and which defines said semiconductor laser element, a first concentrically arranged annularly-shaped semiconductor surface region of said second opposite conductivity type which is spaced from and laterally surrounds said central region and defines said semiconductor diode element, and a second concentrically arranged annularly-shaped semiconductor surface region of said second opposite conductivity type which is spaced from and laterally surrounds said first annularly-shaped region and serves as a detector element for detecting the modulated laser light beam.

References Cited

UNITED STATES PATENTS

| | | | |
|---|---|---|---|
| 2,692,950 | 10/1954 | Wallace | 250—199 |
| 2,776,367 | 1/1957 | Lehovec | 250—199 |
| 3,043,959 | 7/1962 | Diemer | 250—211 |
| 3,121,203 | 2/1964 | Heywang | 250—199 |
| 3,200,259 | 8/1965 | Braunstein | 250—199 |
| 3,229,104 | 1/1966 | Rutz | 250—211 |
| 3,229,106 | 1/1966 | De Lord et al. | 250—199 |
| 3,283,160 | 11/1966 | Levitt et al. | 250—211 |
| 2,929,923 | 3/1960 | Lehovec | 250—199 |
| 3,102,201 | 8/1963 | Braunstein et al. | 250—199 |
| 3,369,133 | 2/1968 | Rutz | 307—299 |

ROBERT L. GRIFFIN, Primary Examiner

BENEDICT V. SAFOUREK, Assistant Examiner

U.S. Cl. X.R.

307—299, 312; 332—7.51